(12) United States Patent
Wang et al.

(10) Patent No.: US 11,881,883 B2
(45) Date of Patent: *Jan. 23, 2024

(54) PATTERN DETECTION BASED PARAMETER ADAPTATION

(71) Applicant: Cadence Design Systems, Inc., San Jose, CA (US)

(72) Inventors: Nanyan Wang, Cupertino, CA (US); Marcus Van Ierssel, Toronto (CA)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,661

(22) Filed: Jan. 13, 2023

(65) Prior Publication Data

US 2023/0231589 A1 Jul. 20, 2023

Related U.S. Application Data

(63) Continuation of application No. 17/106,641, filed on Nov. 30, 2020, now Pat. No. 11,601,151.

(60) Provisional application No. 62/947,075, filed on Dec. 12, 2019.

(51) Int. Cl.
*H04B 1/16* (2006.01)

(52) U.S. Cl.
CPC ..................... *H04B 1/16* (2013.01)

(58) Field of Classification Search
CPC ................ H04B 1/16; H04L 25/03057; H04L 2025/03668
See application file for complete search history.

(56) References Cited

U.S. PATENT DOCUMENTS

| 8,243,782 | B2 | 8/2012 | Mobin et al. |
| 8,243,783 | B2 | 8/2012 | Palmer |
| 8,779,952 | B1 | 7/2014 | Zortea |
| 2005/0134306 | A1 | 6/2005 | Stojanovic et al. |
| 2016/0269006 | A1 | 9/2016 | Itakura et al. |
| 2020/0052933 | A1 | 2/2020 | Lee et al. |

*Primary Examiner* — Janice N Tieu
(74) *Attorney, Agent, or Firm* — Mark H. Whittenberger; Holland & Knight LLP

(57) ABSTRACT

An integrated circuit that includes a feedback loop to adapt receiver parameters. The feedback loop includes a receiver to sample a signal and produce a sampled signal sequence. The feedback loop also includes a first pattern counter to detect and count occurrences of a first pattern in the sampled signal sequence, and a second pattern counter to detect and count occurrences of a second pattern in the sampled signal sequence. Control circuitry coupled to the receiver adapts a parameter value of the receiver to minimize a difference between a first ratio and a second ratio. The first ratio is a target ratio. The second ratio is between a first counted number of occurrences of the first pattern in the sampled signal sequence and a second counted number of occurrences of the second pattern in the sample signal sequence.

20 Claims, 13 Drawing Sheets

SAMPLE, BY A RECEIVER, WHILE THE RECEIVER IS OPERATING USING A PARAMETER VALUE, A FIRST SAMPLED SIGNAL SEQUENCE

402

COUNT A FIRST NUMBER OF OCCURRENCES OF A FIRST PATTERN IN THE FIRST SAMPLED SIGNAL SEQUENCE

404

COUNT A SECOND NUMBER OF OCCURRENCES OF A SECOND PATTERN IN THE FIRST SAMPLED SIGNAL SEQUENCE

406

BASED AT LEAST IN PART ON A COUNT OF THE FIRST NUMBER OF OCCURRENCES AND A COUNT OF THE SECOND NUMBER OF OCCURRENCES, ADJUST THE PARAMETER VALUE

SAMPLE, BY A RECEIVER, WHILE THE RECEIVER IS OPERATING USING A FIRST PARAMETER VALUE, A FIRST SAMPLED SIGNAL SEQUENCE
412

COUNT A FIRST NUMBER OF OCCURRENCES OF A FIRST PATTERN IN THE FIRST SAMPLED SIGNAL SEQUENCE
414

COUNT A SECOND NUMBER OF OCCURRENCES OF A SECOND PATTERN IN THE FIRST SAMPLED SIGNAL SEQUENCE
416

BASED AT LEAST IN PART ON A FIRST DIFFERENCE BETWEEN A TARGET RATIO AND A FIRST MEASURED RATIO, SELECTING A SECOND PARAMETER VALUE TO BE PROVIDED TO THE RECEIVER TO REDUCE THE FIRST DIFFERENCE BETWEEN THE TARGET RATIO AND THE FIRST MEASURED RATIO, THE MEASURED RATIO BEING BASED ON THE FIRST NUMBER OF OCCURRENCES OF THE FIRST PATTERN IN THE FIRST SAMPLED SIGNAL SEQUENCE AND THE SECOND NUMBER OF OCCURRENCES OF THE SECOND PATTERN IN THE FIRST SAMPLED SIGNAL SEQUENCE.
418

*FIG. 4B*

COARSE ADAPTATION OF THRESHOLD FOR NRZ SYMBOL $s_3$

FINE ADAPTATION OF THRESHOLD FOR NRZ SYMBOL $s_3$

COARSE ADAPTATION OF THRESHOLD FOR PAM-4 SYMBOL $s_3$

FINE ADAPTATION OF THRESHOLD FOR PAM-4 SYMBOL $s_3$

PATTERN DETECTION BASED PARAMETER ADAPTATION

BRIEF DESCRIPTION OF THE DRAWINGS

FIGS. 4A-4B are a flowcharts illustrating methods of parameter adaptation.

DETAILED DESCRIPTION OF THE EMBODIMENTS

Serializer/Deserializer (SerDes) parameters such as receiver gains, continuous time linear equalization (CTLE) boost, symbol decision thresholds, equalizer tap coefficients, DC offsets, etc. are iteratively selected to track circuit variations which may be due to, for example, process, voltage, and temperature (PVT) variations. In an embodiment, various SerDes parameters are iteratively adjusted (adapted) based on detected patterns. Two characteristic patterns (e.g., pattern A and pattern B) of samples and/or symbol decisions are selected such that, when a parameter is at its desired value, the patterns occur at a known ratio to each other. These characteristic patterns are concurrently detected and separately counted. The ratio of the occurrences of each of the characteristic patterns is compared to a target ratio to determine adjustments to the parameter being adjusted. When the ratio reaches the target ratio (or is within a selected tolerance range), the parameter is determined to be at its desired value. Selecting different patterns allows the adaptation of different parameters. This allows the adaptation circuit/system to optimize different SerDes parameters using a common objective function (i.e., objective is to adjust the parameter to achieve a desired ratio of pattern A occurrences to pattern B occurrences over a selected time window.)

Figure 1:
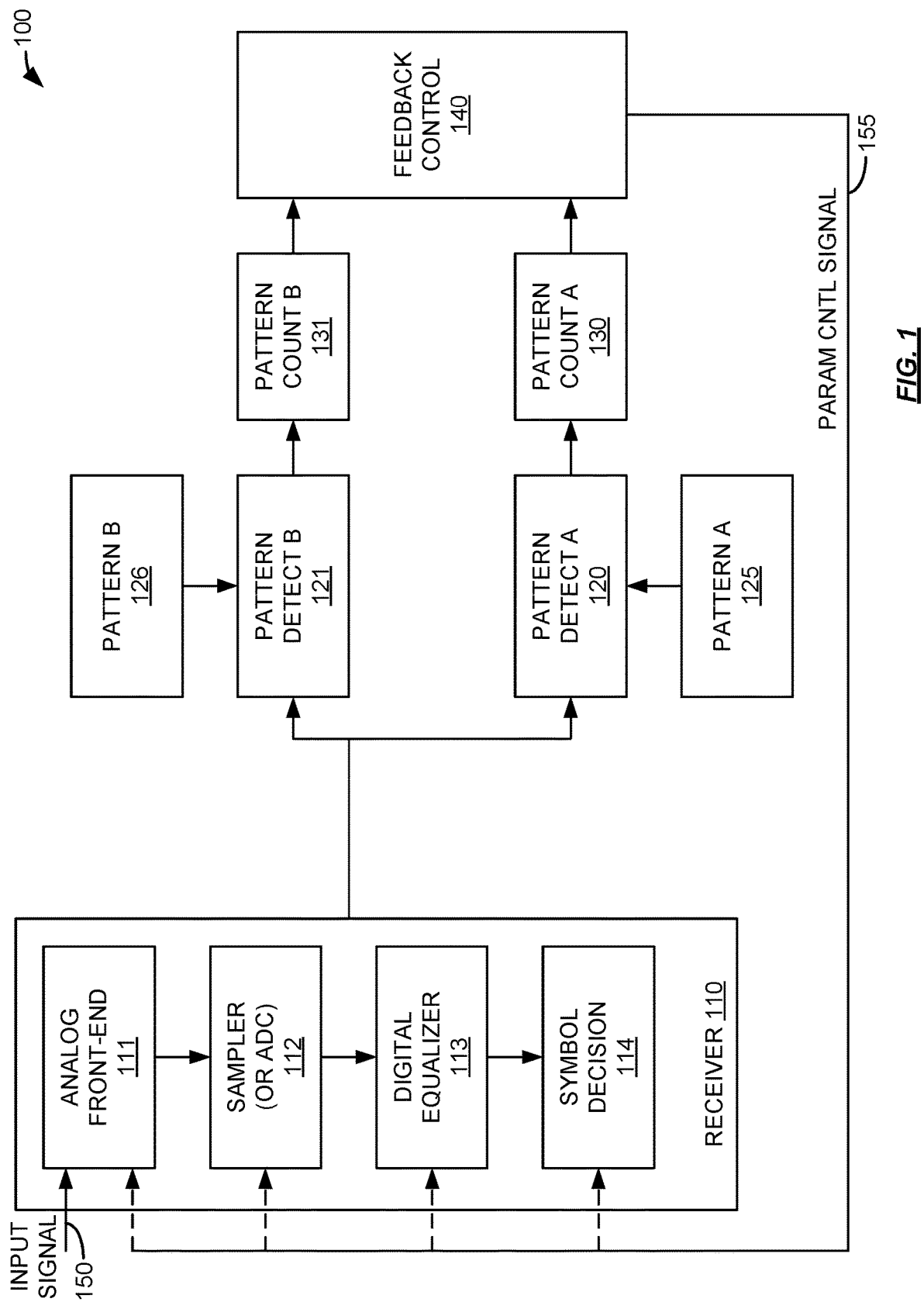
FIG. 1 is a block diagram illustrating a parameter adaptation system.

FIG. 1 is a block diagram illustrating a parameter adaptation system. In FIG. 1, adaptation system 100 comprises input signal 150, receiver 110, pattern detector A 120, pattern detector B 121, pattern provision A 125, pattern provision B 126, pattern counter A 130, pattern counter B 131, feedback control 140, and parameter control signal 155. Receiver 110 may comprise analog front-end (AFE) 111, sampler 112, digital equalizer 113, and symbol decision circuitry 114. Sampler 112 may, in some embodiments, include or comprise an analog-to-digital converter that outputs multiple digital bits. Feedback control 140 may, in some embodiments, include a processing system and/or software. Adaptation system 100 may be implemented on one or more integrated circuits.

Input signal 150 is provided to at least receiver 110. Selected outputs and/or internal signals of receiver 110 are provided to pattern detector A 120 and pattern detector B 121 (e.g., by multiplexor circuitry—not shown in FIG. 1.) For example, one or more of a sampler 112 output, digital equalizer 113, and/or symbol decision circuitry 114, and/or other signals internal to receiver 110 may be selected (e.g., by feedback control 140) and provided to pattern detector A 120 and pattern detector B 121. Pattern detector A 120 receives a pattern (e.g., pattern A) from pattern provision A 125. Pattern detector B 121 receives a pattern (e.g., pattern B) from pattern provision B 126.

Pattern provision A 125 and pattern provision B 126 provide the patterns to be detected to pattern detector A 120 and pattern detector B 121, respectively. The patterns provided by pattern provision A 125 and pattern provision B 126 may be programmable. For example, pattern provision A 125 and pattern provision B 126 may comprise one or more writable registers whose contents define the patterns to be detected. In another example, pattern provision A 125 and pattern provision B 126 may comprise a plurality of fixed valued circuitry and/or read-only registers whose values are selected by one or more control signals (not shown in FIG. 1.) In an embodiment, feedback control 140 may select and/or program the patterns provided by one or more of pattern provision A 125 and/or pattern provision B 126.

Pattern detector A 120 searches the outputs of receiver 110 for the pattern provided by pattern provision A 125 and signals pattern counter A 130 when that pattern occurs. Pattern counter A 130 receives an indicator from pattern detector A 120 that the pattern from pattern provision A 125 has occurred in the outputs from receiver 110. Pattern counter A 130 counts the number of occurrences of the pattern from pattern provision A 125 and provides that count to feedback control 140. Pattern counter A 130 may provide feedback control 140 with the number of occurrences of the pattern from pattern provision A 125 as a single number of occurrences that occurred over a selected time window. Pattern counter A 130 may provide feedback control 140 with a running total of the number of occurrences of the pattern from pattern provision A 125.

Pattern detector B 121 searches the outputs of receiver 110 for the pattern provided by pattern provision B 126 and signals pattern counter B 131 when that pattern occurs. Pattern counter B 131 receives an indicator from pattern detector B 121 that the pattern from pattern provision B 126 has occurred in the outputs from receiver 110. Pattern counter B 131 counts the number of occurrences of the pattern from pattern provision B 126 and provides that count to feedback control 140. Pattern counter B 131 may provide feedback control 140 with the number of occurrences of the pattern from pattern provision B 126 as a single number of occurrences that occurred over a selected time window. Pattern counter B 131 may provide feedback control 140 with a running total of the number of occurrences of the pattern from pattern provision B 126.

Based on the number of occurrences of the pattern from pattern provision A 125 and the number of occurrences of the pattern from pattern provision B 126, feedback control 140 generates a parameter control signal 155. Parameter control signal 155 is provided to receiver 110. The receiver 110 parameter controlled by parameter control signal 155 may be selectable (e.g., by feedback control 140 or a host system—not shown in FIG. 1.) Parameter control signal 155 may be selected to control, for example, one or more sampler thresholds, sampler offsets, analog gains, receiver gains, continuous time linear equalization (CTLE) boost, other CTLE parameters, symbol decision thresholds, equalizer tap coefficients, an analog FFE tap values, DC offsets, and/or analog DFE tap values before the samplers, and/or digital equalizer tap values after one or more ADC type samplers.

Thus, it should be understood that parameter control signal 155 affects a parameter of receiver 110 which, in turn affects one or more values output by receiver 110 in response to input signal 150. The values output by receiver 110 affect how many times the pattern being searched for by pattern detector A 120 (e.g., pattern A) is detected and thereby counted by pattern counter A 130. Likewise, the values output by receiver 110 affect how many times the pattern being searched for by pattern detector B 121 (e.g., pattern B) is detected and thereby counted by pattern counter B 131. The counts output by pattern counter A and pattern counter B are provided to feedback control 140. Feedback control 140 bases one or more new parameter control signals 155 on the counts output by pattern counter A and pattern counter B thereby completing a feedback loop with the provision of one or more new parameter control signals 155 to receiver 110.

Feedback control 140 iteratively generates adjusted values of parameter control signal 155 to minimize (or maximize) an objective function that is based on the number of occurrences received from pattern counter A 130 and the number of occurrences received from pattern counter B 131. For example, feedback control 140 may multiply pattern counter B 131's output with a target ratio (e.g., $r_{target}$). This target ratio is the objective feedback control 140 seeks between the pattern A (provided by pattern provision A 125) occurrence statistics and the pattern B (provided by pattern provision A 125) occurrence statistics at the convergence of adaptation/adjustment.

Feedback control 140 may calculate or determine an adjustment to the parameter being adapted based on a difference between the current ratio of occurrences to the target ratio of occurrences ($r_{target}$). For example, feedback control 140 may integrate the difference between the target ration and the current ratio to calculate the value of a parameter being adjusted during adaptation. Feedback control 140 may also include one or more of a timer to set the duration for pattern statistics evaluation, a finite state machine (FSM) to control the flow of pattern statistics evaluation, and a master FSM to control the overall flow for adaptation and/or eye monitoring.

Adaptation system 100, therefore, may be used to implement one or more of the following adaptation functions: signal detection, mean amplitude of received symbols, symbol decision thresholds, analog front-end (AFE) gain control, AFE boost parameters, equalizer taps, AFE DC offset, sampler DC offset, eye edge detection, eye monitoring, and the like.

As discussed herein, feedback control 140 may iteratively generate adjusted values of parameter control signal 155 to minimize (or maximize) an objective function that is based on the number of occurrences received from pattern counter A 130 and the number of occurrences received from pattern counter B 131. In an example, let g represent a parameter to be adapted. The parameter g may be adjusted during adaptation such that the ratio between the number of occurrences of pattern A from pattern provision A 125 and the number of occurrence of pattern B from pattern provision B 126 in a detection window converges to a target value—$r_{target}$. The example objective function implemented by feedback control 140 can be written as minimizing the expectation of the difference in the number of patterns detected. In other words:

$$\min_g \{E|N_a(k) - N_b(k)r_{target}|^2\}$$

where $N_a(k)$ and $N_b(k)$ are the number of occurrences of pattern A and the number of occurrences of pattern B detected in the kth evaluation window, and $$r_{target} = \frac{E|N_a(k)|}{E|N_b(k)|}$$

is the target ratio when a parameter is adapted to its desired value. The difference in the occurrences of the two characteristic patterns is used to determine the adjustment at the end of a statistics evaluation window. In an embodiment, let $e(k)=N_a(k) - N_b(k)r_{target}$, the parameter g(k) at discrete time k is given by $$g(k) = g(k-1) - u\text{sign}[e(k)]$$

where $$\text{sign}[e(k)] = \begin{cases} 1, & e(k) > 0 \\ 0, & e(k) = 0 \\ -1, & e(k) < 0 \end{cases}$$

and u is the step size for updating the parameter being adapted. In another embodiment, a gradient descent type algorithm may be used to select the adjustment. In other words, determine a first error e'(k) using the parameter value g'(k)=g(k−1)+Δ and a second error e"(k) using the parameter value g"(k)=g(k−1)−Δ, and then select the parameter value g'(k) or g"(k) that is associated with the lesser of e'(k) and e"(k) to be g(k).

Figure 2:
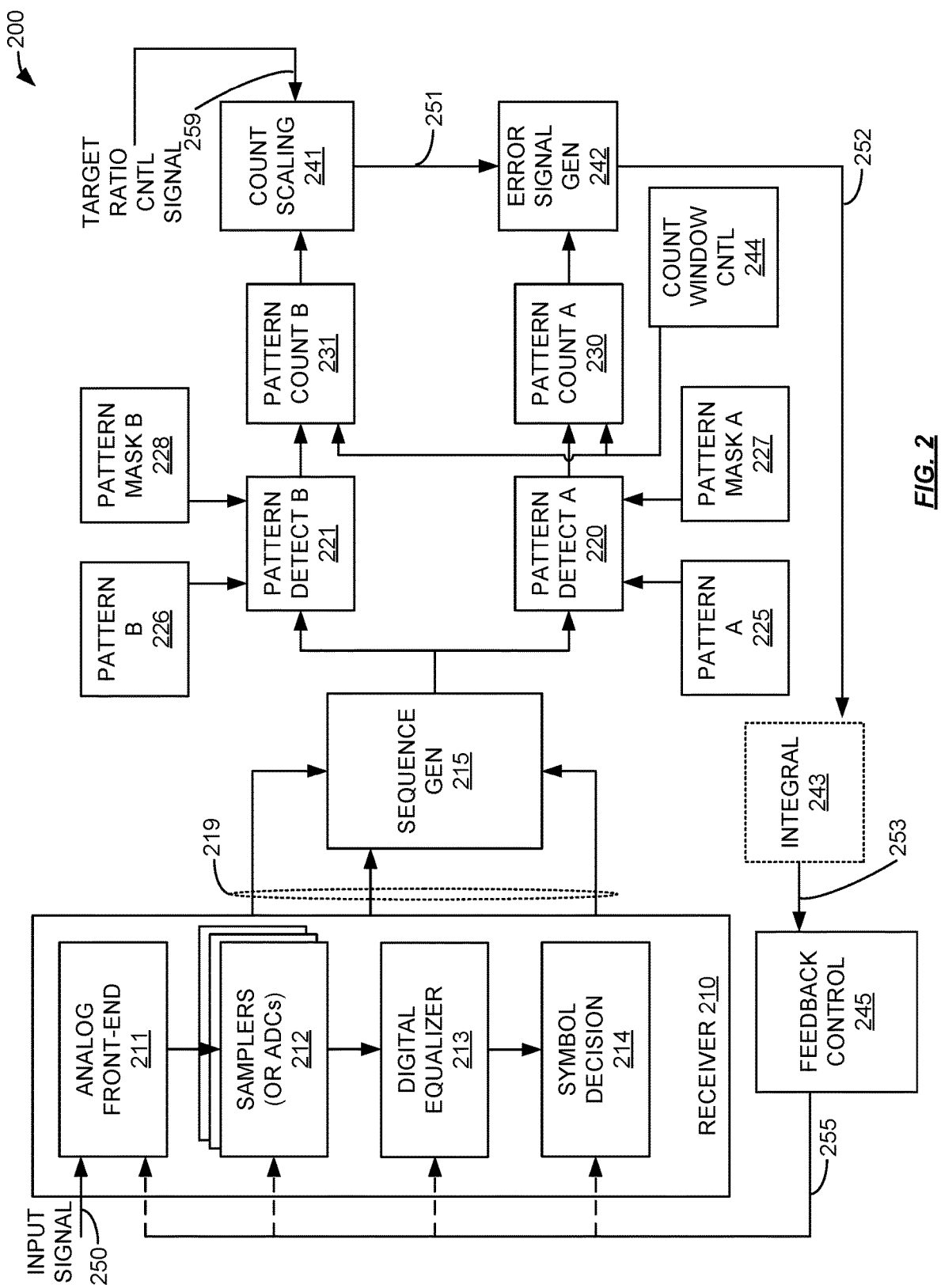
FIG. 2 is a block diagram illustrating a pattern ratio adaptation system.

FIG. 2 is a block diagram illustrating a pattern ratio adaptation system. In FIG. 2, adaptation system 200 comprises receiver 210, sequence generator 215, pattern detection A 220, pattern detector B 221, pattern counter A 230, pattern counter B 231, count scaler 241, error signal generator 242, integrator 243, and feedback control 245. Receiver 210 may comprise analog front-end (AFE) 211, samplers 212, digital equalizer 213, and symbol decision circuitry 214. Samplers 212 may, in some embodiments, include an adaptation sampler. Samplers 212 may, in some embodiments, include or comprise an analog-to-digital converter that outputs multiple digital bits. Adaptation system 200 may be implemented on one or more integrated circuits.

Input signal 250 is provided to receiver 210. A plurality of output signals 219 of receiver 210 are provided to sequence generator 215. Selected outputs and/or internal signals of receiver 210 are provided to sequence generator 215 (e.g., by multiplexor circuitry—not shown in FIG. 2.) For example, one or more of a sampler 212 output, digital equalizer 213, and/or symbol decision circuitry 214, and/or other signals internal to receiver 210 may be selected (e.g., by feedback control 245 and/or a host processor—not shown in FIG. 2) and provided to sequence generator 215. The selected output signals 219 of receiver 210 may include one or more of symbol decisions, sign bits of data samples, and/or sign bits from an adaptation sampler. Sequence generator 215 receives the selected output signals 219 of receiver 210 and formats the outputs into an adaptation sequence that is provided to pattern detection A 220 and pattern detector B 221.

Figure 3:
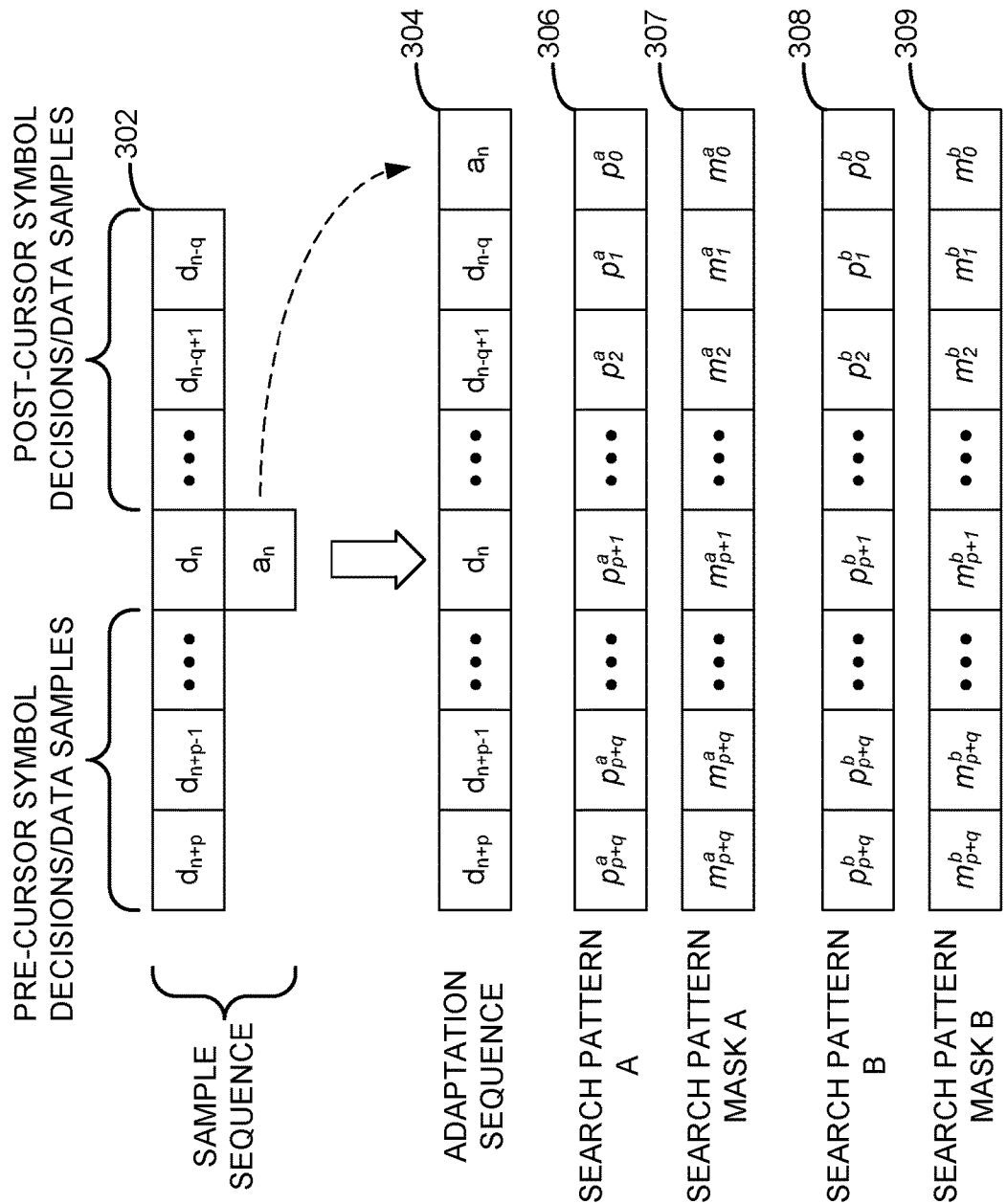
FIG. 3 illustrates example sequences and search patterns.

Reference is now made to FIG. 3. In FIG. 3, a sample sequence 302 of samples and/or symbol decisions are illustrated. Sample sequence 302 includes symbol decisions/data samples corresponding top number of pre-cursor decisions/samples ($d_{n+p}$ to $d_{n+1}$), q number of post-cursor decisions/samples ($d_{n-1}$ to $\Delta_{n-q}$), a data decision/sample (4) made at the cursor, and an adaptation decision/sample (as) also made at the cursor by an adaptation sampler. In an example, sequence generator 215 appends the adaptation decision/sample made at the cursor to the end of the sequence of data decisions/samples $d_{n+p}$ to $d_{n-q}$ to form an adaptation sequence 304 to be evaluated by pattern detectors 220 and 221. However, it should be understood that this location is arbitrary and the adaptation decision/sample an made at the cursor by one or more adaptation samplers may be placed in any consistent location in adaptation sequence 304. In another embodiment, additional adaptation samples (e.g., pre- and/or post-cursor—$a_{n+p}$ to $a_{n-q}$) may be included in adaptation sequence 304 (e.g., interleaved with data samples $d_{n+p}$ to $d_{n-q}$.)

Returning now with reference to FIG. 2, pattern detector A 220 and pattern detector B 221 receive an adaptation sequence from sequence generator 215. Pattern provision A 225 and pattern provision B 226 provide patterns to be detected to pattern detector A 220 and pattern detector B 221, respectively. The patterns provided by pattern provision A 225 and pattern provision B 226 may be programmable. For example, pattern provision A 225 and pattern provision B 226 may comprise one or more writable registers whose contents define the patterns to be detected. In another example, pattern provision A 225 and pattern provision B 226 may comprise a plurality of fixed valued circuitry and/or read-only registers whose values are selected by one or more control signals (not shown in FIG. 2.) In an embodiment, one of pattern provision A 225 and pattern provision B 226 may supply a pattern that masks all of the bits thereby matching all sequences. Providing this type of pattern to one of pattern detector A 220 and pattern detector B 221 causes adaptation system 200 to function in a single pattern detector configuration.

Pattern detector A 220 receives a search pattern (e.g., pattern A) from pattern provision A 225 and a search pattern mask (e.g., search pattern mask A) from pattern mask provision A 227. Pattern detector B 221 receives a search pattern (e.g., search pattern B) from pattern provision B 226 and a search pattern mask (e.g., pattern mask B) from pattern mask provision B 228. The search pattern mask provided by pattern mask provision A 227 and pattern mask provision B 228 may be programmable. For example, pattern mask provision A 227 and pattern mask provision B 228 may comprise one or more writable registers whose contents define which bits are to contribute to pattern detection. In another example, pattern mask provision A 227 and pattern mask provision B 228 may comprise a plurality of fixed valued circuitry and/or read-only registers whose values are selected by one or more control signals (not shown in FIG. 2.)

The search pattern masks provided by search pattern mask provisions 227-228 (e.g., $m_{p+q}$ to $m_0$) determine which corresponding decisions/samples $d_{n+p}$ to $d_{n-q}$ and are considered when determining whether a pattern has been detected by pattern detectors 220-221, respectively. In other words, if a given bit (e.g., $m_{p+1}$ corresponding to the cursor data decision/sample $d_n$) in a search pattern mask is set accordingly, then the corresponding bit in the adaptation sequence will or will not be considered (e.g., the cursor data decision/sample $d_n$ will be considered if $m_{p+1}$ is set to a '1', and will not be considered if $m_{p+1}$ is set to a '0'.)

This is further illustrated in FIG. 3. In FIG. 3, search pattern A 306 having decisions/samples from $p^a_{p+q}$ to $p^a_0$ is masked by the corresponding bits in search pattern mask A 307 having masking bits $m^a_{p+q}$ to $m^a_0$. Likewise, search pattern B 308 having decisions/samples from $p^b_{p+q}$ to $p^b_0$ is masked by the corresponding bits in search pattern mask B 309 having masking bits $m^b_{p+q}$ to $m^b_0$.

Returning now with reference to FIG. 2, pattern detector A 220 searches the adaptation sequence for the pattern provided by the combination of pattern provision A 225 and pattern mask provision A 227. When that pattern occurs, pattern detection A 220 signals pattern counter A 230.

Pattern counter A 230 receives indicators from pattern detector A 220 when the searched for pattern has occurred. Pattern counter A 230 counts the number of occurrences of the pattern over a window of time controlled by count window control 244. Pattern counter B 231 receives indicators from pattern detector B 221 when the searched for pattern has occurred. Pattern counter B 231 counts the number of occurrences of the pattern over the window of time controlled by count window control 244.

The count from pattern counter B 231 is provided to count scaler 241. Count scaler 241 receives a target ratio control signal 259. Target ratio control signal 259 determines the scaling applied to the count from pattern counter B 231. In essence, target ratio control signal 259 may be viewed as corresponding to $r_{target}$ in the previously described objective function:

$$\min_g \{E|N_a(k) - N_b(k)r_{target}|^2\}$$

where $N_a(k)$ and $N_b(k)$ are the number of occurrences of pattern A and the number of occurrences of pattern B detected in the kth evaluation window, and $$r_{target} = \frac{E|N_a(k)|}{E|N_b(k)|}$$

is the target ratio when a parameter is adapted to its desired value.

The output of count scaler 241 is a scaled count 251 (i.e., scaled count 251 equals $r(k) = N_b(k) \times r_{target}$). Scaled count 251 and the count from pattern counter A 230 are provided to error signal generation 242. Error signal generation 242 subtracts scaled count 251 from the count from pattern counter A 230 to produce error signal 252. Thus, error signal generation 242 may be viewed as implementing the previously described error function:

$$e(k) = N_a(k) - N_b(k)r_{target}.$$

Error signal 252 is optionally provided to integrator 243. The output 253 of integrator 243 is provided to feedback control 245. Feedback control 245 generates parameter control signal 255. Parameter control signal 255 is provided to receiver 210. Thus, in an embodiment, integrator 243 and feedback control 245 may be viewed as implementing the previously described functions to generate parameter control signal g(k) of:

$$g(k) = g(k-1) - u\text{sign}[e(k)]$$

where $$\text{sign}[e(k)] = \begin{cases} 1, & e(k) > 0 \\ 0, & e(k) = 0 \\ -1, & e(k) < 0 \end{cases}$$

and u is the step size for updating the parameter being adapted and k is a current discrete time step and/or iteration. In another embodiment, integrator 243 and feedback control 245 may be viewed as implementing a gradient decent type algorithm to generate parameter control signal g(k) by determining a first error e'(k) using the parameter value g'(k)=g(k−1)+Δ, and a second error e"(k) using the parameter value g"(k)=g(k−1)−Δ, and then selecting the parameter value g'(k) or g"(k) that is associated with the lesser of e'(k) and e"(k) to be g(k).

The receiver 210 parameter controlled by parameter control signal 255 may be selectable (e.g., by feedback control 245 or a host system—not shown in FIG. 2.) Parameter control signal 255 may be selected to control, for example, one or more sampler thresholds, sampler offsets, analog gains, receiver gains, continuous time linear equalization (CTLE) boost, other CTLE parameters, symbol decision thresholds, equalizer tap coefficients, DC offsets, analog FFE tap values, and/or analog DFE tap values before the samplers, and/or digital equalizer tap values after one or more ADC type samplers.

FIG. 4A is a flowchart illustrating a method of parameter adaptation. The steps illustrated in FIG. 4A may be performed by one or more of adaptation system 100, and/or adaptation system 200. By a receiver, and while the receiver is operating using a parameter value, a first sampled signal sequence is sampled (402). For example, an adaptation sampler and a data sampler of samplers 210, while being provided a first value for parameter control signal 255, may repeatedly sample input signal 250 thereby generating an adaptation sequence of samples.

A first number of occurrences of a first pattern in the first sampled sequence is counted (404). For example, in response to signals from pattern detector A 220, pattern counter A 230 may count the number of occurrences, in the sequence from sequence generator 215, of the pattern provided by pattern A provision 225 and pattern mask A provision 227.

A second number of occurrences of a first pattern in the first sampled sequence is counted (406). For example, in response to signals from pattern detector B 221, pattern counter B 231 may count the number of occurrences, in the sequence from sequence generator 215, of the pattern provided by pattern provision B 226 and pattern mask provision B 228.

Based at least in part on the count of the first number of occurrences and the count of the second number of occurrences, adjust the parameter value (408). For example, count scaler 241, error signal generator 242, integrator 243, and feedback control 245 may, based on the count from pattern A counter 230 and the count from pattern counter B 231, select a new value for parameter control signal 255. The new value from parameter control signal 255 may be selected to reduce the difference between the ratio of the count from pattern A counter 230 and the count from pattern counter B 231 and a target ratio (e.g., $r_{target}$.)

FIG. 4B is a flowchart illustrating a method of parameter adaptation. The steps illustrated in FIG. 4B may be performed by one or more of adaptation system 100, and/or adaptation system 200. By a receiver, and while the receiver is operating using a first parameter value, a first sampled signal sequence is sampled (412). For example, an adaptation sampler and a data sampler of samplers 210, while being provided a first value for parameter control signal 255, may repeatedly sample input signal 250 thereby generating an adaptation sequence of samples.

A first number of occurrences of a first pattern in the first sampled sequence is counted (414). For example, in response to signals from pattern detector A 220, pattern counter A 230 may count the number of occurrences, in the sequence from sequence generator 215, of the pattern provided by pattern A provision 225 and pattern mask A provision 227.

A second number of occurrences of a first pattern in the first sampled sequence is counted (416). For example, in response to signals from pattern detector B 221, pattern counter B 231 may count the number of occurrences, in the sequence from sequence generator 215, of the pattern provided by pattern provision B 226 and pattern mask provision B 228.

Based at least in part on a first difference between a target ratio and a first measured ratio, selecting a second parameter value to be provided to the receiver to reduce the first difference between the target ratio and the first measured ratio, the measured ratio being based on the first number of occurrences of the first pattern in the first sampled signal sequence and the second number of occurrences of the second pattern in the first sampled signal sequence (418). For example, count scaler 241, error signal generator 242, integrator 243, and feedback control 245 may, based on the count from pattern A counter 230 and the count from pattern counter B 231, select a new value for parameter control signal 255. The new value from parameter control signal 255 may be selected to reduce the difference between the ratio of the count from pattern A counter 230 and the count from pattern counter B 231 and a target ratio (e.g., $r_{target}$.)

Herein, NRZ mode is treated as a case of PAM-4 mode by replicating each 1-bit symbol to form a 2-bit symbol decision so a common architecture can be used for both PAM-4 and NRZ modes. The symbol decisions for PAM-4 and NRZ are as follows: $s_0$=00b corresponds to decision symbol for PAM-4 transmit level (−3) or NRZ transmit level (−1); $s_1$=01b corresponds to decision symbol for PAM-4 transmit level (−1); $s_2$=10b corresponds to decision symbol for PAM-4 transmit level (+1); and $s_3$=11b corresponds to decision symbol for PAM-4 transmit level (+3) or NRZ transmit level (+1). Also, for the purposes of the following discussion, a mask bit value of '0' corresponds to the corresponding pattern bit not being considered when searching for a pattern, and a mask bit value of '1' corresponds to the corresponding pattern bit being considered when searching for a pattern.

Figure 5A:
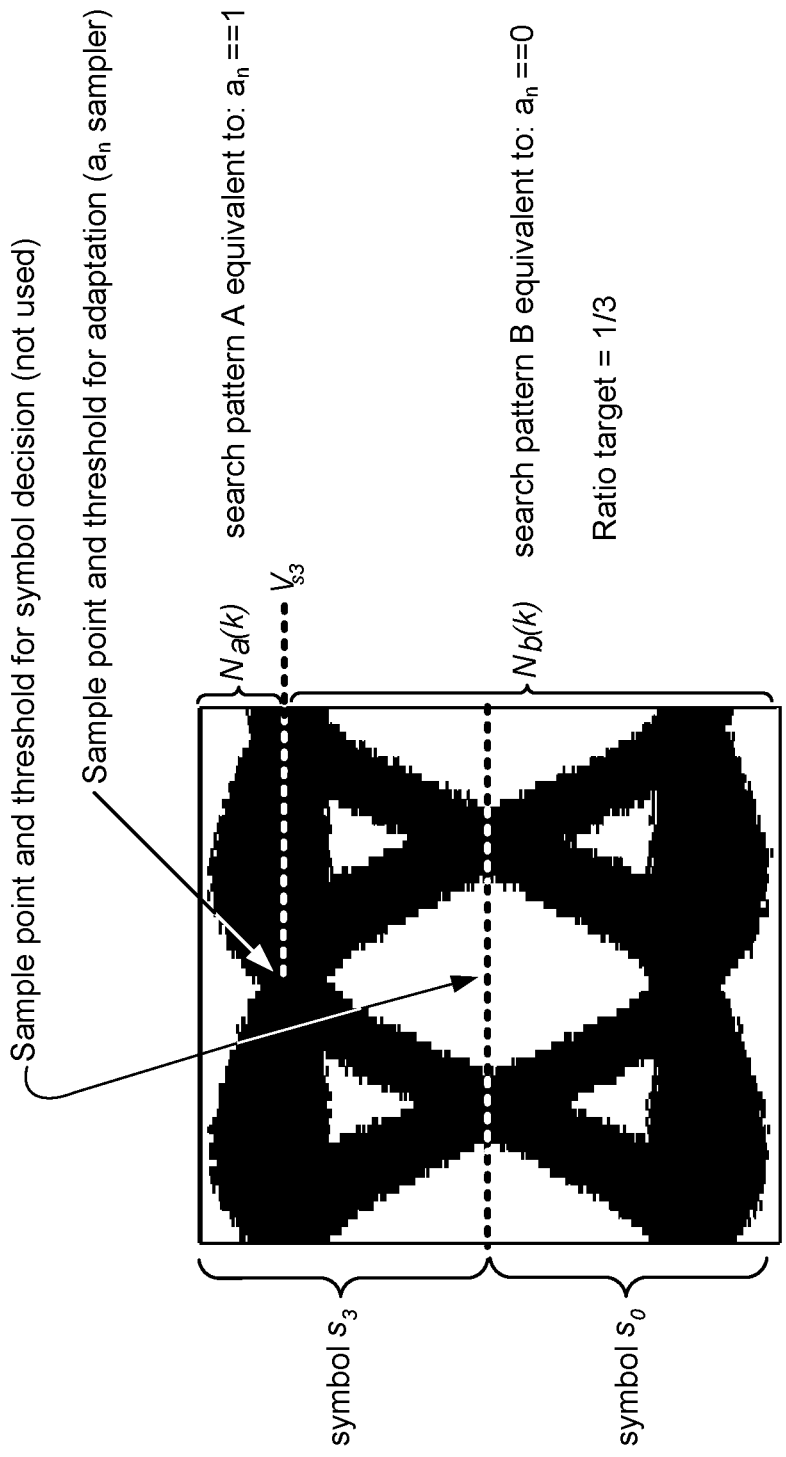
FIG. 5A illustrates an example coarse adaptation of mean amplitude of a received symbol based on the signal voltage distribution of an NRZ eye pattern.

FIG. 5A illustrates an example coarse adaptation of mean amplitude of received symbol (e.g., symbol $s_3$) based on the signal voltage distribution of an NRZ eye pattern. The adaptation illustrated in FIG. 5A may be performed by one or more elements of adaptation system 100 and/or adaptation system 200. The parameter being adapted in FIG. 5A is $V_{s3}$. Table 1 illustrates example search patterns and search pattern mask configurations used for an initial adaptation of the amplitude level for symbol $s_3$ as illustrated in FIG. 5A. It should be understood that the patterns and pattern masks detailed in Table 1 correspond to a pattern A that is found when $a_n$==1 (other bits are don't care) and a pattern B that is found when $a_n==0$ (other bits are don't care). The target ratio $r_{target}$ is 0.25/(1−0.25)=1/3.

TABLE 1

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 00 | ... | 00 | ... | 00 | 1 |
| Pattern A mask | 00 | 00 | ... | 00 | ... | 00 | ... | 00 | 1 |
| Pattern B | 00 | 00 | ... | 00 | ... | 00 | ... | 00 | 0 |
| Pattern B mask | 00 | 00 | ... | 00 | ... | 00 | ... | 00 | 1 |

In another example (not shown in FIG. 5A), pattern B may be set to a pattern that matches all sequences (i.e., all bits are don't care) while pattern A is found when $a_n==1$ (other bits are don't care). In this example, $r_{target}$ is 0.25/(1)=1/4.

Figure 5B:
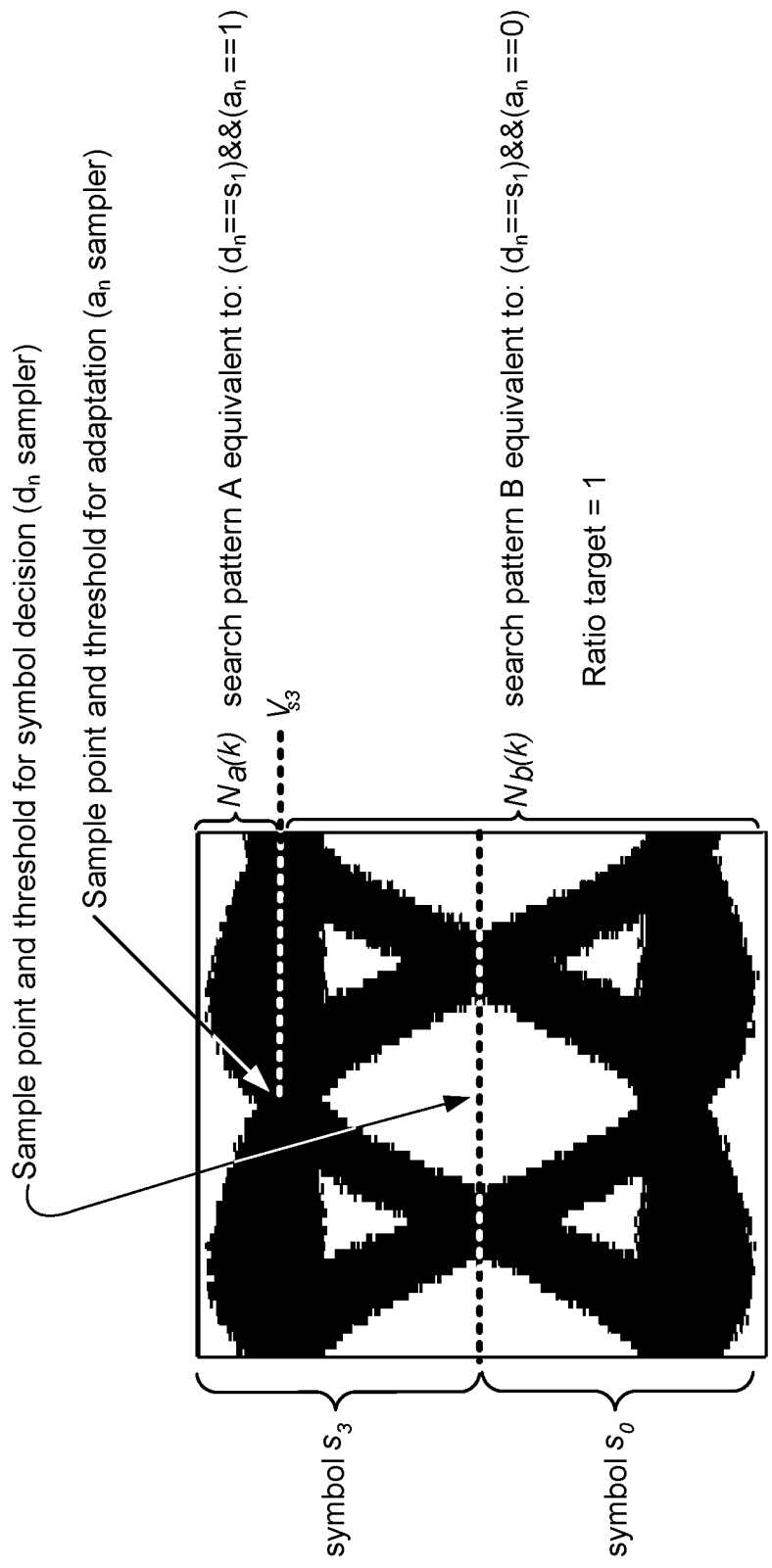
FIG. 5B illustrates an example fine adaptation based on the signal voltage distribution of an NRZ eye pattern.

FIG. 5B illustrates an example fine adaptation based on the signal voltage distribution of an NRZ eye pattern. The adaptation illustrated in FIG. 5B may be performed by one or more elements of adaptation system 100 and/or adaptation system 200. The parameter being adapted in FIG. 5B is $V_{s3}$. Table 2 illustrates example search patterns and search pattern mask configurations used for a fine adaptation of the amplitude level for symbol $s_3$ as illustrated in FIG. 5B. It should be understood that the patterns and pattern masks detailed in Table 2 correspond to a pattern A that is found when the symbol decision equals $s_3$ and $a_n==1$ (other bits are don't care) and a pattern B that is found when the symbol decision equals $s_3$ but $a_n==0$ (other bits are don't care).

TABLE 2

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 11 | ... | 00 | ... | 00 | 1 |
| Pattern A mask | 00 | 00 | ... | 11 | ... | 00 | ... | 00 | 1 |
| Pattern B | 00 | 00 | ... | 11 | ... | 00 | ... | 00 | 0 |
| Pattern B mask | 00 | 00 | ... | 11 | ... | 00 | ... | 00 | 1 |

Figure 6:
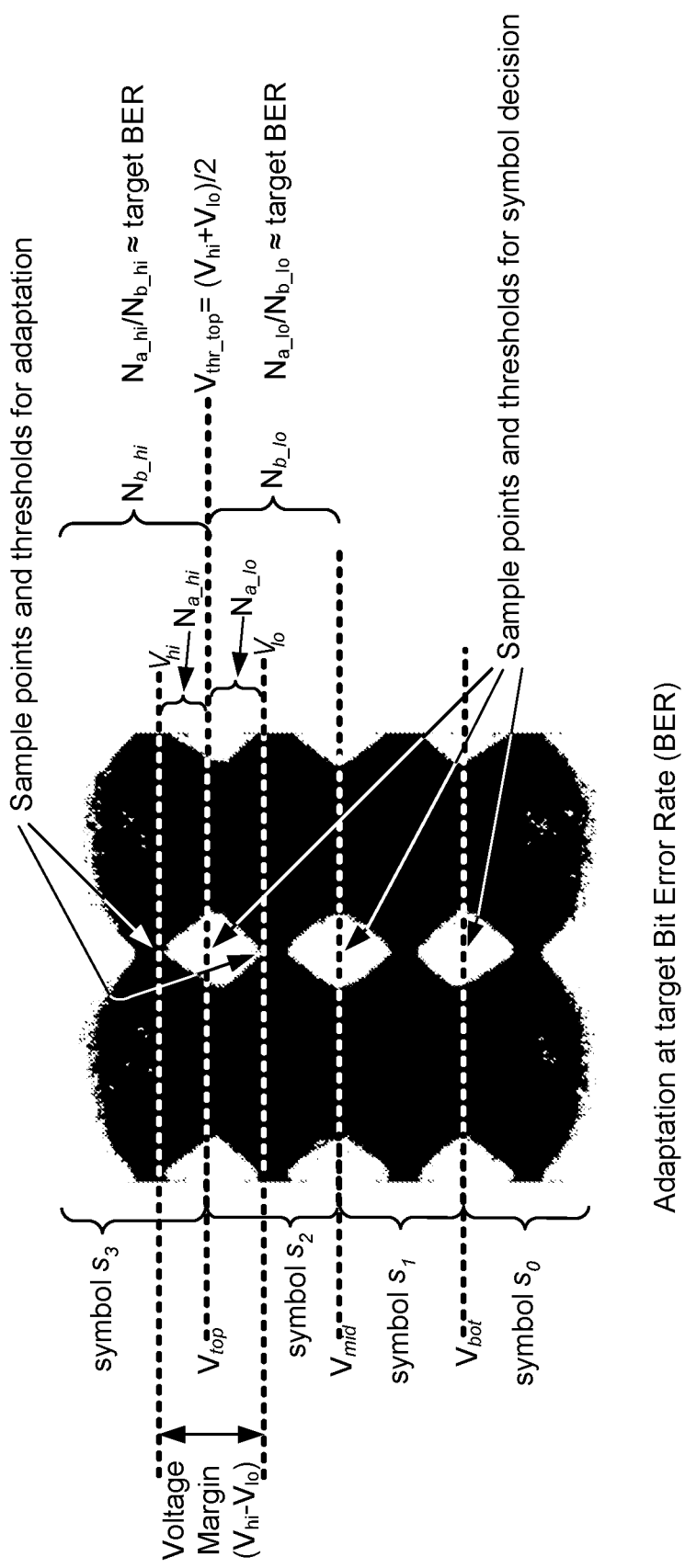
FIG. 6 illustrates example parameter adaptations based on voltage margin of a four-level pulse amplitude modulation (PAM-4) eye pattern.

FIG. 6 illustrates example parameter adaptations based on voltage margin of a four-level pulse amplitude modulation (PAM-4) eye pattern. The adaptations illustrated in FIG. 6 may be performed by one or more elements of adaptation system 100 and/or adaptation system 200. To adapt multiple parameters, let $g_m$ denote the mth parameter being adapted, the objective function for the adaptation of $g_m$ is $$\max_{g_m}[V_{hi} - V_{lo}]$$

where $V_{hi}$ and $V_{lo}$ are the upper and lower edge of vertical eye opening at a target bit error rate (BER). Using the top PAM-4 eye as an example, $V_{hi}$ and $V_{lo}$ are adapted such that the expectation of the difference between the measured BER, $r_{ber}$, and a target rate, r target, is minimized $$\min_{\{V_{hi}, V_{lo}\}} [E(|r_{ber}(k) - r_{target}|)]$$

where $r_{ber}(k) = N_a(k)/N_b(k)$ at discrete time k is the ratio of the number of pattern A being detected to the number of pattern B being detected in an evaluation window.

Figure 7A:
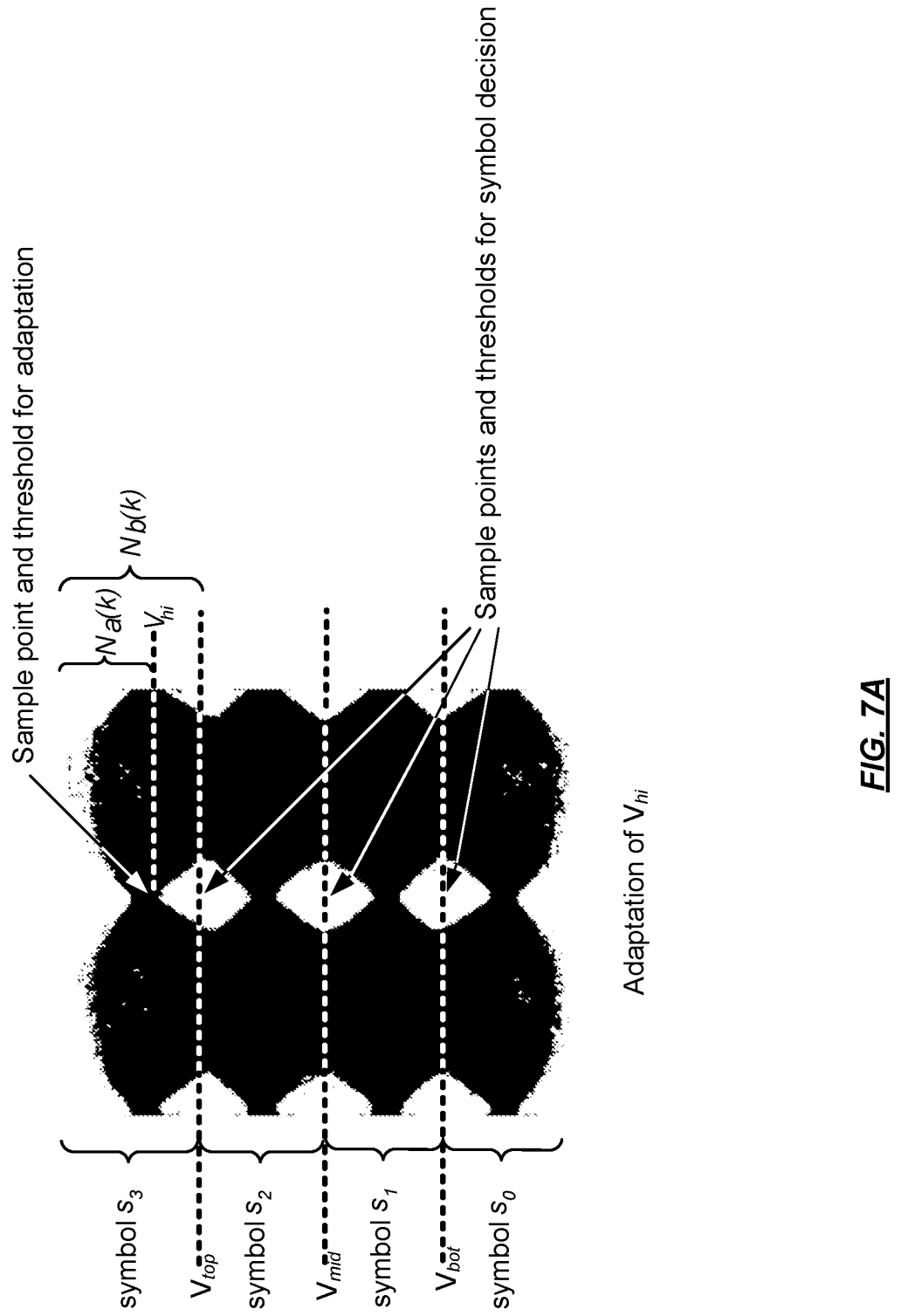
FIGS. 7A-7B illustrate example adaptations based on the voltage margin edges of a PAM-4 eye pattern.
Figure 7B:
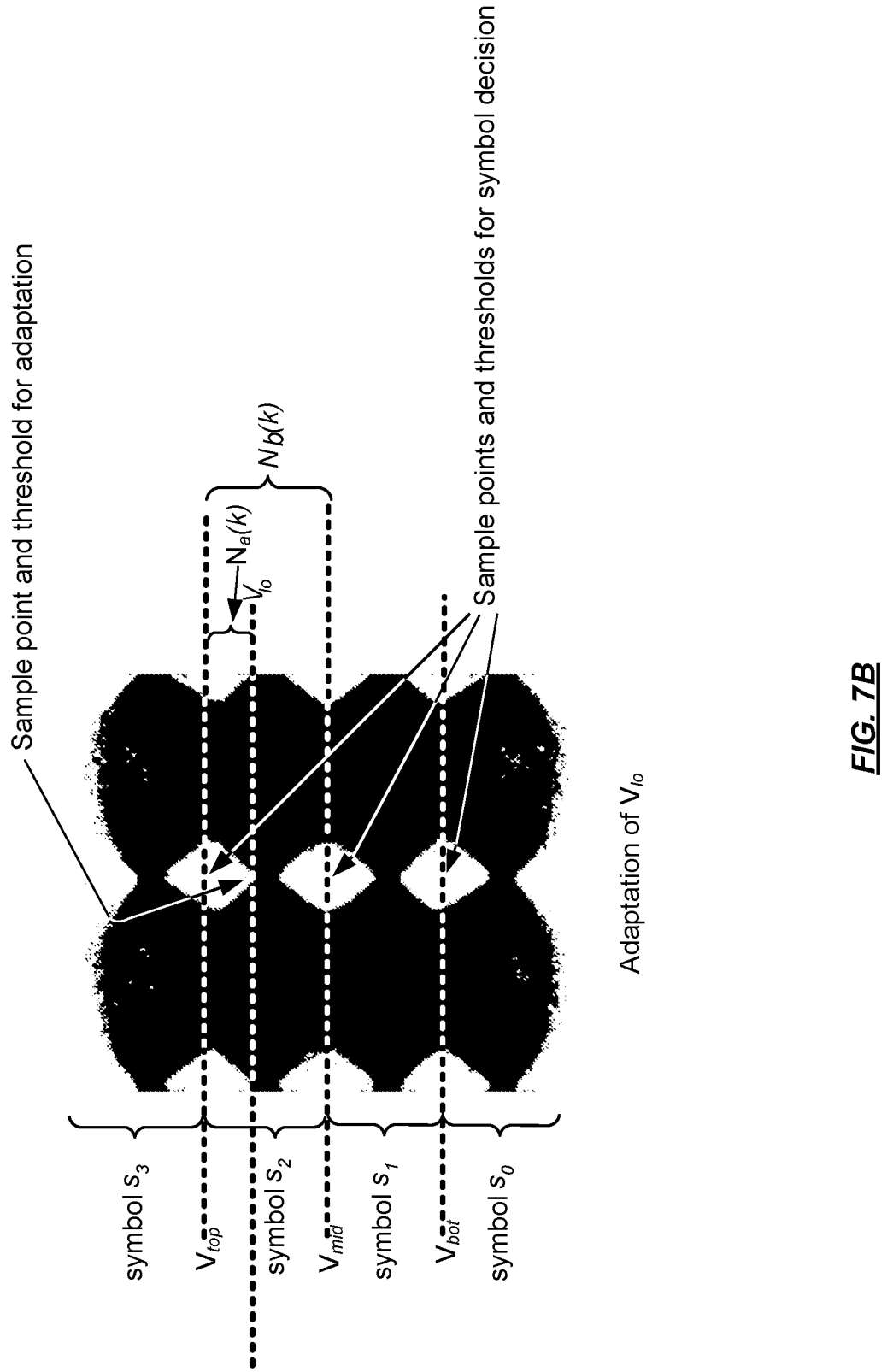

FIGS. 7A-7B illustrate example adaptations based on the voltage margin edges of a PAM-4 eye pattern. The adaptations illustrated in FIGS. 7A-7B may be performed by one or more elements of adaptation system 100 and/or adaptation system 200. FIG. 7A illustrates the adaptation of V hi. Table 3 illustrates example search patterns and search pattern mask configurations used for $V_{hi}$ as illustrated in FIG. 7A.

TABLE 3

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 11 | ... | 00 | ... | 00 | 0 |
| Pattern A mask | 00 | 00 | ... | 11 | ... | 00 | ... | 00 | 1 |
| Pattern B | 00 | 00 | ... | 11 | ... | 00 | ... | 00 | 0 |
| Pattern B mask | 00 | 00 | ... | 11 | ... | 00 | ... | 00 | 0 |

FIG. 7B illustrates the adaptation of $V_{lo}$. Table 4 illustrates example search patterns and search pattern mask configurations used for $V_{lo}$ as illustrated in FIG. 7B.

TABLE 4

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 10 | ... | 00 | ... | 00 | 0 |
| Pattern A mask | 00 | 00 | ... | 11 | ... | 00 | ... | 00 | 1 |
| Pattern B | 00 | 00 | ... | 10 | ... | 00 | ... | 00 | 0 |
| Pattern B mask | 00 | 00 | ... | 11 | ... | 00 | ... | 00 | 0 |

An objective function for the adaptation of upper edge $V_{hi}$ and the lower eye edge $V_{lo}$ at a target BER can be rewritten as:

$$\min_{V_{hi}(k)/V_{lo}(k)} \{E|N_a(k) - N_b(k)r_{ber}|^2\}$$

$$N_a(k) = \begin{cases} \sum_{n=0}^{N_w-1} (d_n == s_3 \text{ and } a_n == 0), & \text{for detecting } V_{hi} \\ \sum_{n=0}^{N_w-1} (d_n == s_2 \text{ and } a_n == 1), & \text{for detecting } V_{lo} \end{cases}$$

$$N_b(k) = \begin{cases} \sum_{n=0}^{N_w-1} (d_n == s_3), & \text{for detecting } V_{hi} \\ \sum_{n=0}^{N_w-1} (d_n == s_2), & \text{for detecting } V_{lo} \end{cases}$$

To measure $V_{hi}$ and $V_{lo}$ using the adaptation system 100 and/or adaptation system 200, let $r_{target}=r_{ber}$. Each parameter is adapted by finding its optimum which leads to the maximum voltage margin at a target BER. For example, the PAM-4 decision threshold between symbol $s_3$ and $s_2$ is given by:

$$V_{top}(k) = \frac{V_{hi}(k) + V_{lo}(k)}{2}$$

which is the symbol decision threshold between symbol $s_3$ and $s_2$ at the target BER. Other parameters such AFE boost and gains, the voltage margins at different settings, etc. may be evaluated. The settings which lead to the maximum voltage margin at a target BER may be selected as the optimum set of settings.

In an embodiment, equalizer tap coefficients may be adapted by one or more elements of adaptation system 100 and/or adaptation system 200. Adaptation system 100 and/or adaptation system 200 may optimize to an objective function that decorrelates the data at the input of an equalizer and symbol decision error. For example, pattern A and pattern B may be configured to detect positive correlation and negative correlation of the input of an equalizer and symbol decision error. To adapt the mth equalizer tap (e.g., m∈ {−p, −p+1, ..., −1, 0, 1, ..., q}), the coefficient of the mth tap is adapted to decorrelate the mth data sample from main cursor at an equalizer input and the sign bit of main cursor's sample amplitude error (main cursor's sample amplitude error is the difference between the sampled main cursor's amplitude and the corresponding mean amplitude of data samples which have the same symbol being detected). In particular:

$$\min_{h_m(k)}[E(|\text{sign}[x_{n-m}(k)] * \text{sign}(e_n(k))|)]$$

where $x_{n-m}(k)$ is the mth data sample from main cursor. Signal $e_n(k)$ is the corresponding sample amplitude error of main cursor sample $x_n(k)$. To rewrite the objective function, let $d_{n-m}=\text{sign}[x_{n-m}(k)]$ and symbol decision error $a_n=\text{sign}(e_n(k))$. This allows the objective function to be rewritten as $$\min_{g_m(k)}\{E|N_a(k) - N_b(k)r_{target}|^2\}$$

where the target ratio $r_{target}$ is 1 and $$N_a(k) = \sum_{n=0}^{N_w-1} (d_{n-m} == 1 \text{ and } a_n == 1)$$

$$N_b(k) = \sum_{n=0}^{N_w-1} (d_{n-m} == 1 \text{ and } a_n == 0)$$

Using feed-forward equalization (FFE) as an example, the mth FFE tap may be adapted by adaptation system 100 and/or adaptation system 200 by using the example pattern A and pattern B give in Table 5

TABLE 5

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 00 | ... | 01 | ... | 00 | 1 |
| Pattern A mask | 00 | 00 | ... | 00 | ... | 01 | ... | 00 | 1 |
| Pattern B | 00 | 00 | ... | 00 | ... | 01 | ... | 00 | 0 |
| Pattern B mask | 00 | 00 | ... | 00 | ... | 01 | ... | 00 | 1 |

Figure 8A:
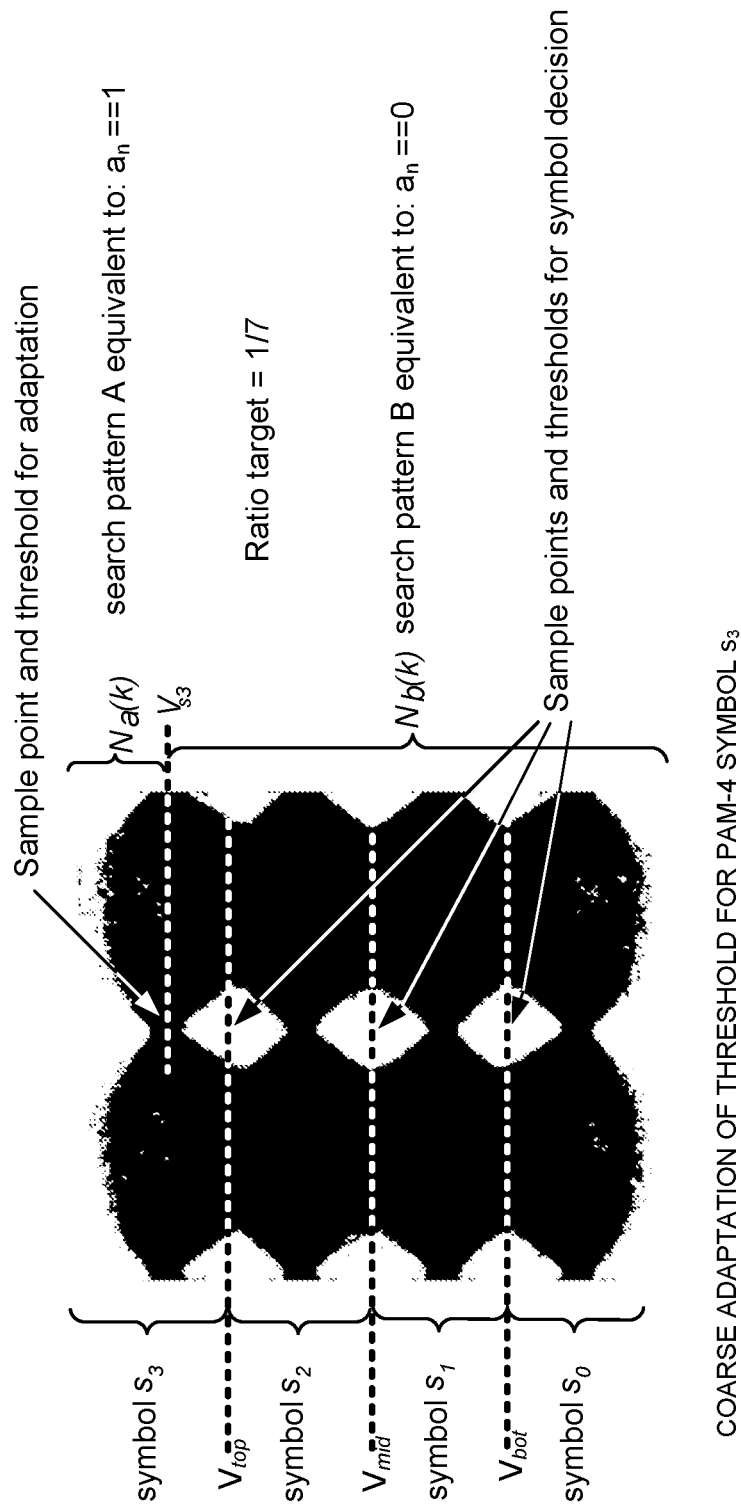
FIG. 8A illustrates an example coarse adaptation based on the signal voltage distribution of a PAM-4 eye pattern.

FIG. 8A illustrates an example coarse adaptation based on the signal voltage distribution of a PAM-4 eye pattern. The adaptation illustrated in FIG. 8A may be performed by one or more elements of adaptation system 100 and/or adaptation system 200. The parameter being adapted in FIG. 8A is $V_{s3}$. Table 6 illustrates example search patterns and search pattern mask configurations used for an initial adaptation of the amplitude level for symbol $s_3$ illustrated in FIG. 8A. It should be understood that the patterns and pattern masks detailed in Table 6 correspond to a pattern A that is found when $a_n==1$ (other bits are don't care) and a pattern B that is found when $a_n==0$ (other bits are don't care). The target ratio $r_{target}$ is 0.125/(1−0.125)=1/7.

TABLE 6

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 00 | ... | 00 | ... | 00 | 1 |
| Pattern A mask | 00 | 00 | ... | 00 | ... | 00 | ... | 00 | 1 |
| Pattern B | 00 | 00 | ... | 00 | ... | 00 | ... | 00 | 0 |
| Pattern B mask | 00 | 00 | ... | 00 | ... | 00 | ... | 00 | 1 |

Figure 8B:
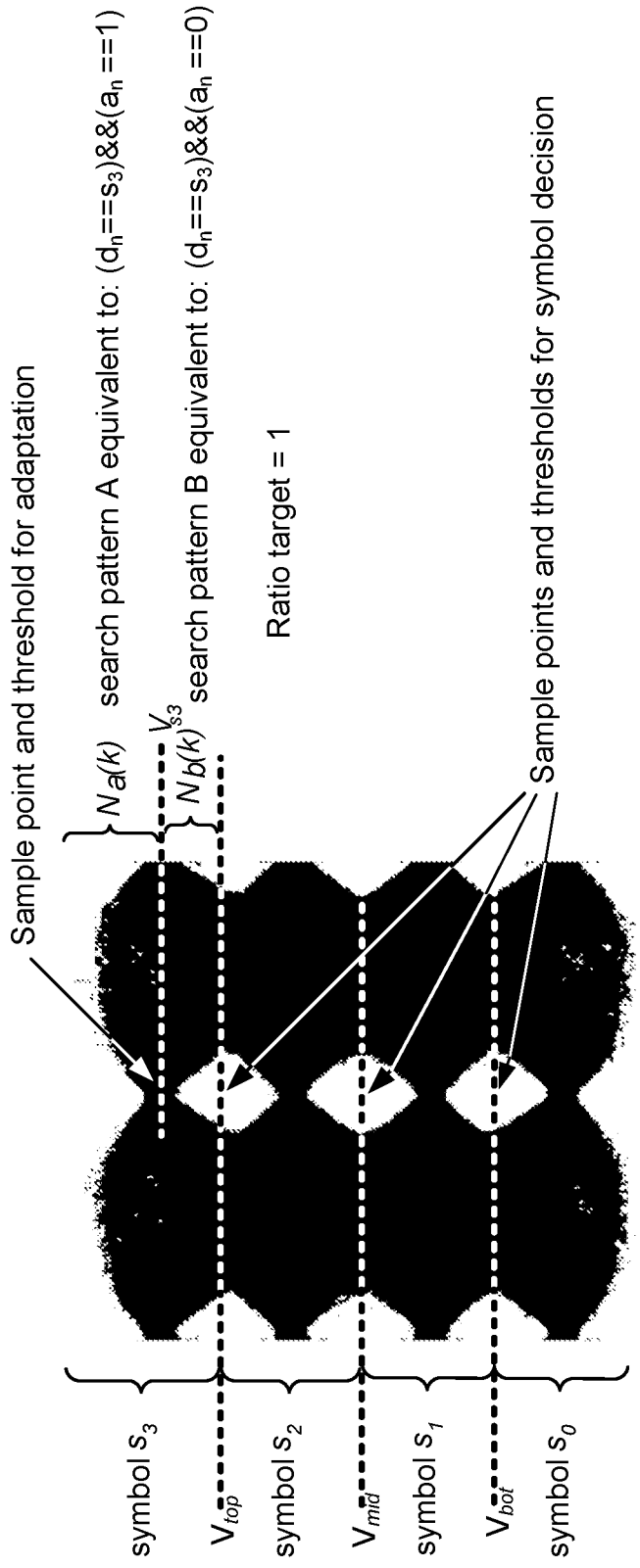
FIG. 8B illustrates a fine adaptation based on the signal voltage distribution of a PAM-4 eye pattern.

FIG. 8B illustrates a fine adaptation based on the signal voltage distribution of a PAM-4 eye pattern. The adaptation illustrated in FIG. 8B may be performed by one or more elements of adaptation system 100 and/or adaptation system 200. The parameter being adapted in FIG. 8B is $V_{s3}$. Table 7 illustrates example search patterns and search pattern mask configurations used for a fine adaptation of the amplitude level for symbol $s_3$ illustrated in FIG. 8B. It should be understood that the patterns and pattern masks detailed in Table 7 correspond to a pattern A that is found when the symbol decision equals $s_3$ and $a_n==1$ (other bits are don't care) and a pattern B that is found when the symbol decision equals $s_3$ but $a_n==0$ (other bits are don't care). The target ratio $r_{target}$ is 0.5/(1−0.5)=1.

TABLE 7

| Adaptation Sequence | $d_{n+p}$ | $d_{n+p-1}$ | ... | $d_n$ | ... | $d_{n-m}$ | ... | $d_{n-q}$ | $a_n$ |
|---|---|---|---|---|---|---|---|---|---|
| Pattern A | 00 | 00 | ... | 11 | ... | 00 | ... | 00 | 1 |
| Pattern A mask | 00 | 00 | ... | 11 | ... | 00 | ... | 00 | 1 |
| Pattern B | 00 | 00 | ... | 11 | ... | 00 | ... | 00 | 0 |
| Pattern B mask | 00 | 00 | ... | 11 | ... | 00 | ... | 00 | 1 |

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of adaptation system 100, and/or adaptation system 200, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
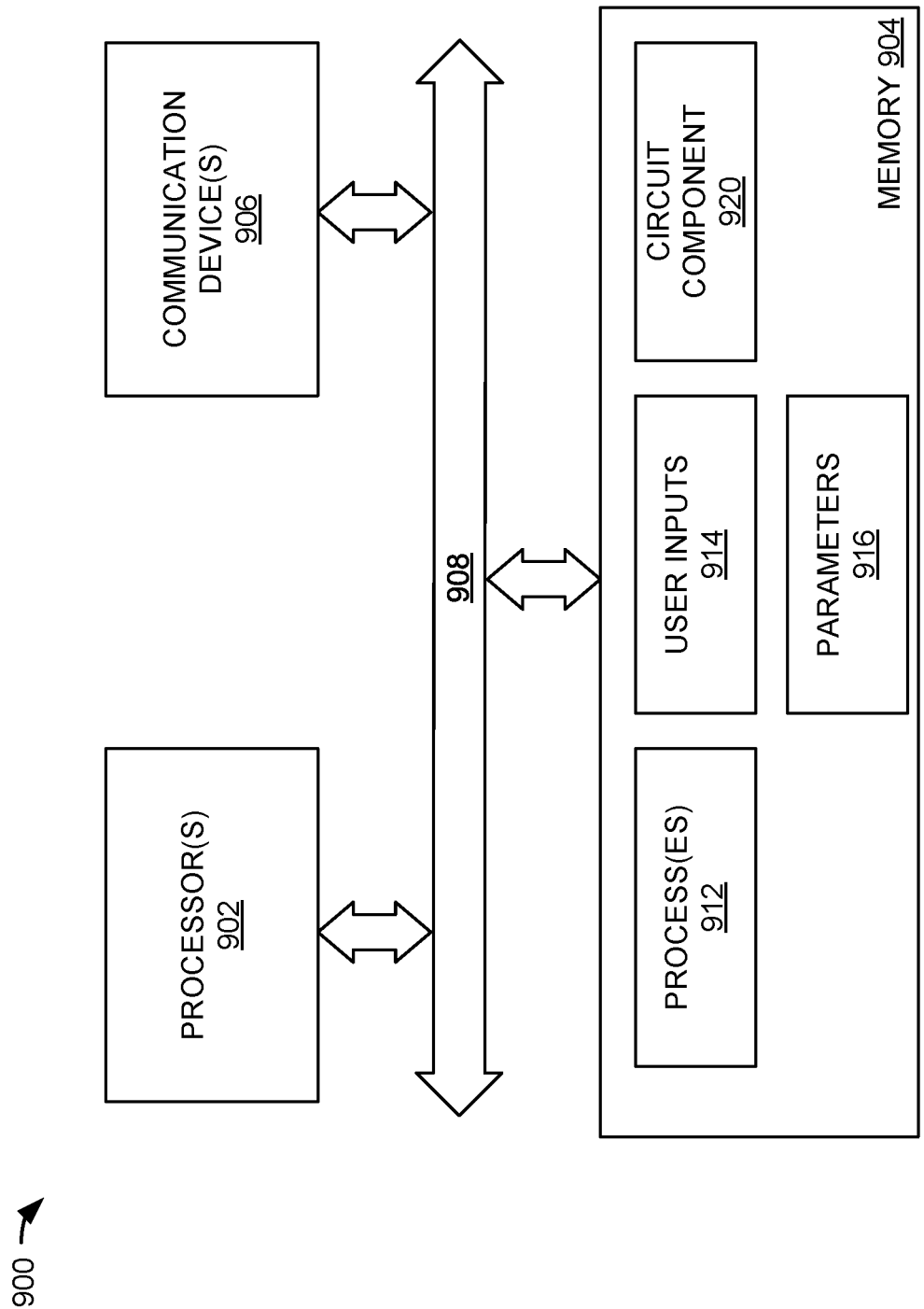
FIG. 9 is a block diagram illustrating a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of adaptation system 100, and/or adaptation system 200, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: An integrated circuit, comprising: at least one receiver to sample a signal and produce a sampled signal sequence; a first pattern counter to detect and count occurrences of a first pattern in the sampled signal sequence; a second pattern counter to detect and count occurrences of a second pattern in at least the sampled signal sequence; and, control circuitry to adapt a parameter value of the at least one receiver based on the counted occurrences of the first pattern by the first pattern counter and the counted occurrences of the second pattern by the second pattern counter.

Example 2: The integrated circuit of example 1, wherein the parameter value is adapted to minimize a difference between a first ratio and a second ratio, the second ratio to be between a first counted number of occurrences of the first pattern in the sampled signal sequence and a second counted number of occurrences of the second pattern in the sample signal sequence.

Example 3: The integrated circuit of example 2, wherein the first counted number of occurrences of the first pattern in the sampled signal sequence and the second counted number of occurrences of the second pattern are detected in a window of consecutive samples in the sampled signal sequence.

Example 4: The integrated circuit of example 2, wherein the control circuitry includes a finite state machine to receive an error indicator corresponding to the difference between the first ratio and the second ratio and to, based on the error indicator, select an adapted parameter value.

Example 5: The integrated circuit of example 1, wherein the control circuitry is coupled to at least one sampler of the receiver.

Example 6: The integrated circuit of example 1, wherein the at least one receiver comprises an adaptation sampler and a data sampler.

Example 7: The integrated circuit of example 6, wherein the sampled signal sequence includes a first at least one sample produced by the adaptation sampler.

Example 8: An integrated circuit, comprising: a receiver to produce a first set of sequential data samples, the receiver to receive a first indicator of a parameter that affects at least one sampled value in the first set of sequential data samples; a first pattern detector to signal occurrences of a first pattern in at least the first set of sequential data samples; a first counter to count occurrences of the first pattern in at least the first set of sequential data samples; a second pattern detector to signal occurrences of a second pattern in at least the first set of sequential data samples; a second counter to count occurrences of the second pattern in at least the first set of sequential data samples; and, feedback loop control to iteratively adjust the parameter.

Example 9: The integrated circuit of example 8, wherein the feedback loop control iteratively adjusts the parameter to minimize a difference between a target ratio and a measured occurrence ratio, the measured occurrence ratio to be between a first count of occurrences of the first pattern in the first set of sequential data samples and a second count of occurrences of the second pattern the first set of sequential data samples.

Example 10: The integrated circuit of example 8, further comprising: pattern provision circuitry to provide a first plurality of patterns to at least the first pattern detector.

Example 11: The integrated circuit of example 10, wherein at least a first one of the first plurality of patterns include at least one pattern mask indicator that indicates at least a portion of the first one of the first plurality of patterns is not to be used in a detection of an occurrence of the first one of the first plurality of patterns in the first set of sequential data samples.

Example 12: The integrated circuit of example 10, further comprising: at least one adaptation sampler to sample the signal and produce a second set of sequential data samples.

Example 13: The integrated circuit of example 12, wherein at least one of the second set of sequential data samples is included in the first set of sequential data samples.

Example 14: The integrated circuit of example 12, wherein at least a first one of the first plurality of patterns include at least one pattern mask indicator that indicates at least a portion of the first one of the first plurality of patterns is not to be used in a detection of an occurrence of the first one of the first plurality of patterns in the second set of sequential data samples.

Example 15: A method, comprising: sampling, by a receiver and while the receiver is operating using a parameter value, a first sampled signal sequence; counting a first number of occurrences of a first pattern in the first sampled signal sequence; counting a second number of occurrences of a second pattern in the first sampled signal sequence; and, based at least in part on a count of the first number of occurrences and a count of the second number of occurrences, adjusting the parameter value.

Example 16: The method of example 15, wherein based at least in part on a first difference between a target ratio and a measured ratio, a second parameter value is selected to be provided to the at least one sampler to reduce the first difference between the target ratio and the measured ratio, the measured ratio being based on the first number of occurrences of the first pattern in the first sampled signal sequence and the second number of occurrences of the second pattern in the first sampled signal sequence.

Example 17: The method of example 16, further comprising: sampling, by the receiver and while the receiver is operating using the second parameter value, a second sampled signal sequence; counting a third number of occurrences of the first pattern in the second sampled signal sequence; counting a fourth number of occurrences of the second pattern in the second sampled signal sequence; and, based at least in part on a second difference between the target ratio and a second measured ratio, selecting a third parameter value to be provided to the receiver to reduce the second difference between the target ratio and the second measured ratio, the second measured ratio being based on the third number of occurrences of the first pattern in the second sampled signal sequence and the fourth number of occurrences of the second pattern in the second sampled signal sequence.

Example 18: The method of example 15, further comprising: sampling, by at least one adaptation sampler, a second sampled signal sequence.

Example 19: The method of example 18, wherein the counting of the first number of occurrences of the first pattern is further based on a first at least one sample of the second sampled signal sequence.

Example 20: The method of example 18, wherein the counting of the second number of occurrences of the second pattern is further based on a second at least one sample of the second sampled signal sequence.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
   at least one adaptation sampler to sample a signal and produce an adaptation sample set;
   at least one data sampler to sample the signal and produce a sampled data signal sequence;
   a sequence generator to receive the sampled data signal sequence and the adaptation sample set and produce an adaptation sequence;
   a first pattern counter to detect and count occurrences of a first pattern in the adaptation sequence;
   a second pattern counter to detect and count occurrences of a second pattern in the adaptation sequence; and,
   adaptation control circuitry to adapt a parameter value of a receiver comprising the at least one data sampler based on a first ratio between the counted occurrences of the first pattern by the first pattern counter and the counted occurrences of the second pattern by the second pattern counter.

2. The integrated circuit of claim 1, wherein the parameter value is adapted to minimize a difference between the first ratio and a second ratio.

3. The integrated circuit of claim 2, further comprising:
   window control circuitry to select a set of consecutive samples in the sampled data signal sequence to be combined with the adaptation sample set.

4. The integrated circuit of claim 3, wherein the sequence generator concatenates the sample data signal sequence and the adaptation sample set to produce the adaptation sequence.

5. The integrated circuit of claim 3, wherein the sequence generator interleaves the sample data signal sequence and the adaptation sample set to produce the adaptation sequence.

6. The integrated circuit of claim 2, wherein the control circuitry includes a finite state machine to receive an error indicator corresponding to the difference between the first ratio and the second ratio and to, based on the error indicator, select an adapted parameter value.

7. The integrated circuit of claim 1, wherein the control circuitry is coupled to at least one sampler of the receiver.

8. An integrated circuit, comprising:
   adaptation sampler to sample a signal and produce an adaptation sample set;
   a data receiver to receive the signal and produce a first set of sequential data samples, the data receiver to receive a first indicator of a parameter that affects at least one sampled value in the first set of sequential data samples;
   a sequence generator to receive the first set of sequential data samples and the adaptation sample set and produce an adaptation sequence;
   a first pattern detector to signal occurrences of a first pattern in the adaptation sequence;
   a first counter to count occurrences of the first pattern in the adaptation sequence;
   a second pattern detector to signal occurrences of a second pattern in the adaptation sequence;
   a second counter to count occurrences of the second pattern in the adaptation sequence; and
   feedback loop control to, based on a measured occurrence ratio between a first count of occurrences of the first pattern in the adaptation sequence and a second count of occurrences of the second pattern in the adaptation sequence, iteratively adjust the parameter.

9. The integrated circuit of claim 8, wherein the feedback loop control iteratively adjusts the parameter to minimize a difference between a target ratio and the measured occurrence ratio.

10. The integrated circuit of claim 8, further comprising:
pattern provision circuitry to provide a first plurality of patterns to at least the first pattern detector.

11. The integrated circuit of claim 10, wherein at least a first one of the first plurality of patterns include at least one pattern mask indicator that indicates at least a portion of the first one of the first plurality of patterns is not to be used in a detection of an occurrence of the first one of the first plurality of patterns in the adaptation sequence.

12. The integrated circuit of claim 10, wherein the sequence generator concatenates the first set of sequential data samples and the adaptation sample set to produce the adaptation sequence.

13. The integrated circuit of claim 12, wherein the sequence generator interleaves the first set of sequential data samples and the adaptation sample set to produce the adaptation sequence.

14. The integrated circuit of claim 12, wherein at least a first one of the first plurality of patterns include at least one pattern mask indicator that indicates at least a portion of the first one of the first plurality of patterns is not to be used in a detection of an occurrence of the first one of the first plurality of patterns in the wherein the sequence generator concatenates the first set of sequential data samples and the adaptation sample set to produce the adaptation sequence.

15. A method, comprising:
sampling, by a receiver using a data sampler and while the receiver is operating using a parameter value, a first sampled signal sequence;
sampling, by the receiver, and concurrently with sampling by the data sampler, a first adaptation sample set;
combining the first sampled signal sequency and the first adaptation sample set to produce a first adaptation sequence;
counting a first number of occurrences of a first pattern in the first adaptation sequence;
counting a second number of occurrences of a second pattern in the first adaptation sequence; and
based at least in part on a measured ratio between a count of the first number of occurrences and a count of the second number of occurrences, adjusting the parameter value.

16. The method of claim 15, wherein based at least in part on a first difference between a target ratio and the measured ratio, a second parameter value is selected to be provided to the at least one sampler of the receiver to reduce the first difference between the target ratio and the measured ratio.

17. The method of claim 16, further comprising:
sampling, by the receiver and while the receiver is operating using the second parameter value, a second sampled signal sequence;
sampling, by the receiver, and concurrently with sampling by the data sampler, a second adaptation sample set;
combining the second sampled signal sequence and the second adaptation sample set to produce a second adaptation sequence;
counting a third number of occurrences of the first pattern in the second adaptation sequence;
counting a fourth number of occurrences of the second pattern in the second adaptation sequence; and
based at least in part on a second difference between the target ratio and a second measured ratio, selecting a third parameter value to be provided to the receiver to reduce the second difference between the target ratio and the second measured ratio, the second measured ratio being based on the third number of occurrences of the first pattern in the second sampled signal sequence and the fourth number of occurrences of the second pattern in the second adaptation sequence.

18. The method of claim 17, wherein the first set of sequential data samples and the adaptation sample set are concatenated to produce the first adaptation sequence.

19. The method of claim 17, wherein the first set of sequential data samples and the adaptation sample set are concatenated to produce the first adaptation sequence.

20. The method of claim 17, wherein the counting of the second number of occurrences of the second pattern is further based on a second at least one sample of the second sampled signal sequence.

* * * * *